United States Patent
Hokansson et al.

(10) Patent No.: US 9,353,001 B2
(45) Date of Patent: May 31, 2016

(54) FIBER BRAGG GRATINGS IN CARBON-COATED OPTICAL FIBERS AND TECHNIQUES FOR MAKING SAME

(71) Applicants: Adam Hokansson, Granby, CT (US); David J Kudelko, Rockaway, NJ (US); Yaowen Li, Princeton, NJ (US); Joanna Y Ng, Warren, NJ (US); Debra A Simoff, Simsbury, CT (US)

(72) Inventors: Adam Hokansson, Granby, CT (US); David J Kudelko, Rockaway, NJ (US); Yaowen Li, Princeton, NJ (US); Joanna Y Ng, Warren, NJ (US); Debra A Simoff, Simsbury, CT (US)

(73) Assignee: OFS FITEL, LLC, Norcross, GA (US)

(*) Notice: Subject to any disclaimer, the term of this patent is extended or adjusted under 35 U.S.C. 154(b) by 177 days.

(21) Appl. No.: 14/169,541

(22) Filed: Jan. 31, 2014

(65) Prior Publication Data

US 2015/0285993 A1    Oct. 8, 2015

Related U.S. Application Data

(60) Provisional application No. 61/784,347, filed on Mar. 14, 2013.

(51) Int. Cl.
| | | |
|---|---|---|
| *G02B 6/02* | (2006.01) | |
| *C03C 25/10* | (2006.01) | |
| *C03B 37/027* | (2006.01) | |

(52) U.S. Cl.
CPC .......... *C03C 25/106* (2013.01); *C03C 25/1075* (2013.01); *G02B 6/02138* (2013.01); *G02B 6/02395* (2013.01); *C03B 37/027* (2013.01); *C03B 2201/21* (2013.01); *C03B 2201/22* (2013.01); *C03B 2201/31* (2013.01); *C03B 2203/22* (2013.01); *C03B 2205/20* (2013.01); *G02B 2006/02161* (2013.01)

(58) Field of Classification Search
CPC ........... G02B 6/02395; G02B 6/02133; G02B 2006/02161
See application file for complete search history.

(56) References Cited

U.S. PATENT DOCUMENTS

| 6,067,392 A | 5/2000 | Wakami |
| 6,396,983 B1 * | 5/2002 | Atkins .................... C03C 25/12 |
| | | 385/145 |

FOREIGN PATENT DOCUMENTS

JP    H1082919 A    3/1998

* cited by examiner

*Primary Examiner* — Jerry Rahll
(74) *Attorney, Agent, or Firm* — Jacobs & Kim LLP (57) ABSTRACT

A technique is described for fabricating one or more optical devices in a carbon-coated optical fiber. A photosensitive optical fiber is provided having a hermetic carbon coating. Further provided is a laser having a beam output that is configured to inscribe one or more refractive index modulations into the optical fiber through the hermetic carbon layer while leaving the hermetic carbon layer intact. The laser is used to inscribe one or more optical devices into the optical fiber through the hermetic carbon layer.

12 Claims, 9 Drawing Sheets

FIBER BRAGG GRATINGS IN CARBON-COATED OPTICAL FIBERS AND TECHNIQUES FOR MAKING SAME

CROSS REFERENCE TO RELATED APPLICATIONS

The present application claims the priority benefit of U.S. Provisional Patent Application Ser. No. 61/784,347, filed on Mar. 14, 2013, which is owned by the assignee of the present application, and which is incorporated herein by reference in its entirety.

BACKGROUND OF THE INVENTION

1. Field of the Invention

The present invention relates generally to the field of fiber optics, and in particular to fiber gratings and like optical devices for use in harsh environments.

2. Background Art

The demand for optical fibers and fiber-based devices has dramatically increased over the past decade. However, in humid or hydrogen-rich environments, fiber-based devices, such as sensors or other devices employing fiber Bragg gratings (FBGs), typically require shielding in order to address mechanical robustness and reliability issues, as well as issues relating to optical functionality. The reliability and optical performance of these devices are of primary importance to designers of optical components and systems.

There is thus an ongoing need in the art for FBGs and other fiber-based devices that are capable of reliable performance in harsh environments.

SUMMARY OF INVENTION

An aspect of the invention is directed to a method for fabricating gratings or like optical devices in a carbon-coated optical fiber. A photosensitive optical fiber is provided having a hermetic carbon coating. Further provided is a laser having a beam output that is configured to inscribe one or more refractive index modulations into the optical fiber through the hermetic carbon layer while leaving the hermetic carbon layer intact. The laser is used to inscribe one or more optical devices into the optical fiber through the hermetic carbon layer.

Further aspects of the invention are directed to structures and techniques for mass production of carbon-coated optical devices. In one practice of the invention, optical devices are written into a carbon-coated optical fiber in a post-secondary-coating process. In another practice of the invention, optical devices are written into a fiber on the draw tower during the optical fiber drawing process, subsequent to the application of a carbon coating onto the fiber.

DETAILED DESCRIPTION

Aspects of the invention are directed to optical devices, such as fiber Bragg gratings (FBGs) and the like, that are fabricated in an optical fiber having a hermetic carbon coating. The structures and techniques described herein can be used, for example, to fabricate FBGs for use as sensors in a harsh environment. In addition, the described structures and techniques can be used to fabricate FBGs displaying improved fatigue resistance.

As used herein, the term "harsh environment" generally refers to an environment in which a hermetic carbon coating is useful in protecting an optical device. Such an environment includes, for example: a high-humidity environment, a hydrogen-rich environment; an environment that is both high-humidity and hydrogen-rich; a high-water-content or aqueous environment, such as liquid water; or the like. Generally speaking, hermeticity to water improves mechanical reliability in a harsh environment, and hermeticity to hydrogen improves optical reliability.

As used herein, the terms "hermetic carbon coating" and "carbon coating" refer to a coating applied to a fiber surface so as to hermetically seal the portion of the fiber contained within the carbon coating. The carbon coating serves a number of purposes, including, for example: providing the glass fiber surface with a seal against water molecules, including condensed water, water vapor at a wide range of temperatures, and the like; protecting against ingress of hydrogen or deuterium to ~130° C. or higher, depending on the coating structure; and extending the expected life of a given fiber in a given environment by retarding fatigue and by reducing stress corrosion failures.

In one carbon-coating technique, a carbon layer is applied onto the outer surface of an optical fiber in a draw tower as part of the drawing process. The draw tower is equipped with a carbon reactor, through which optical fiber travels after it has been drawn from a preform. Within the carbon reactor, a chemical vapor deposition (CVD) technique is used to deposit a hermetic layer of amorphous carbon at a temperature of 1200° C. onto the outer surface of the optical fiber. A typical thickness for the carbon coating is ~0.02 µm to ~0.08 µm.

The CVD technique is implemented by causing reactant gases to flow through the carbon reactor in the absence of oxygen. A pyrolytic reaction occurs at the glass surface of the drawn fiber, resulting in thermal deposition of the carbon onto the fiber surface. A minimum thickness of deposited carbon is required in order for the carbon coating to be hermetic. Typically, a polymer coating is then applied over the carbon layer.

A carbon-coating technique is described in greater detail, for example, in Lindholm et al., "Low Speed Carbon Deposition Process for Hermetic Optical Fibers," International Wire and Cable Symposium (1999).

For a number of reasons, carbon coatings have not been used in connection with FBGs and like optical devices. First, gratings may not be inscribed into a fiber prior to the application of a carbon coating because the high temperatures required to apply the carbon coating may destroy the gratings. Second, previously, it has generally been believed that gratings cannot be inscribed into a fiber subsequent to the application of a carbon coating, because of the carbon coating's lack of transparency with respect to a UV laser beam.

The present invention is based on the insight that, if a fiber has a sufficiently high degree of photosensitivity, and if the inscribing laser is configured to operate within a suitable power range, it is possible to apply a hermetic carbon coating onto the fiber's cladding and then subsequently inscribe gratings into the fiber through the carbon coating without breaching the hermetic seal.

Generally speaking, the inscription of gratings into carbon-coated optical fibers can employ any of the configurations and techniques that are used for inscribing gratings into optical fibers without carbon coatings. Thus, gratings can be inscribed into a carbon-coated optical fiber using a holographic technique, a phase-mask technique, or the like. Depending upon a particular situation, some adjustments or modifications may be necessary.

As discussed below, the inscription of gratings into a carbon-coated optical fiber can be performed as part of the initial draw process or in a separate, post-secondary-coating process.

Photosensitivity

As noted above, in order for gratings to be written into a fiber through a carbon coating, the fiber must have a suitable degree of photosensitivity. The degree of photosensitivity required in a given situation depends upon a number of factors, including (1) the strength of the gratings to be inscribed and (2) the interaction between the inscribing laser beam and the carbon coating through which the gratings are to be written.

According to an aspect of the invention, a suitable degree of photosensitivity in a given fiber is achieved through the use of one or more dopants that are known to create photosensitivity. These dopants include, for example, germanium, as well as fluorine, boron, or the like. Depending upon a particular application, it may be desirable to employ one or more co-dopants in one or more fiber regions in order to arrive at a fiber design having a desired degree of photosensitivity as well as a particular refractive index profile or other desired property.

A suitable fiber for a given application of the present invention may be provided in any of a number of different ways. For example, in certain situations it may be possible to employ an already existing fiber design, if the fiber has a suitable degree of photosensitivity. Alternatively, an already existing fiber design may be modified by making suitable adjustments to its photosensitivity. In some situations, it may be necessary or desirable to custom design a suitable optical fiber. The design of such an optical fiber will be understood adequately by a practitioner in the art to include, e.g.: core, trench, clad dimensions and refractive index, as well as the possibility of incorporating other structures, such as multiple cores, polarization-maintaining stress rods, a star-shaped or octagonal cladding, a rectangular core, one or more coatings of various types, and the like.

According to a further aspect of the invention, hydrogen loading or deuterium loading may be used to enhance the photosensitivity of the carbon-coated fiber, and thus the reflectivity (i.e., strength) of gratings written into the fiber. As mentioned above, a carbon coating protects against hydrogen ingression to ~130° C. or higher, depending on the coating structure. Thus, it is possible to load a carbon-coated optical fiber with hydrogen or deuterium, prior to inscription, by placing the fiber in a pressurized chamber containing hydrogen or deuterium at a suitable concentration and maintaining a fiber temperature above ~130° C. for a suitable amount of time. The parameters for such a conditioning schedule (e.g., time, temperature, and pressure) are dependent upon the required photosensitivity of the fiber, the hermeticity of the carbon coating, and the capability of the secondary coating to survive this exposure.

Gratings are subsequently inscribed into the fiber in accordance with the techniques described herein. According to a further aspect of the invention, once the gratings have been inscribed into the fiber, they are then annealed at a temperature of greater than ~130° C. to allow the excess loaded hydrogen or deuterium to escape from the fiber.

Experimental Confirmation

Aspects of the invention have been confirmed in a series of experiments, in which gratings were successfully inscribed into a carbon-coated test fiber. The successful outcome of these experiments has led to the development of a number of manufacturing techniques, discussed below, that can be used for mass production of carbon-coated gratings.

Figure 1:
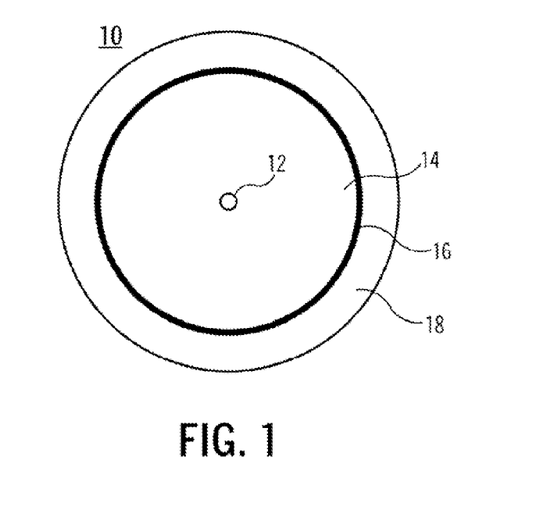
FIGS. 1 and 2 show diagrams, respectively, of a test optical fiber and a grating inscription setup used in an experimental demonstration of the invention.
Figure 2:
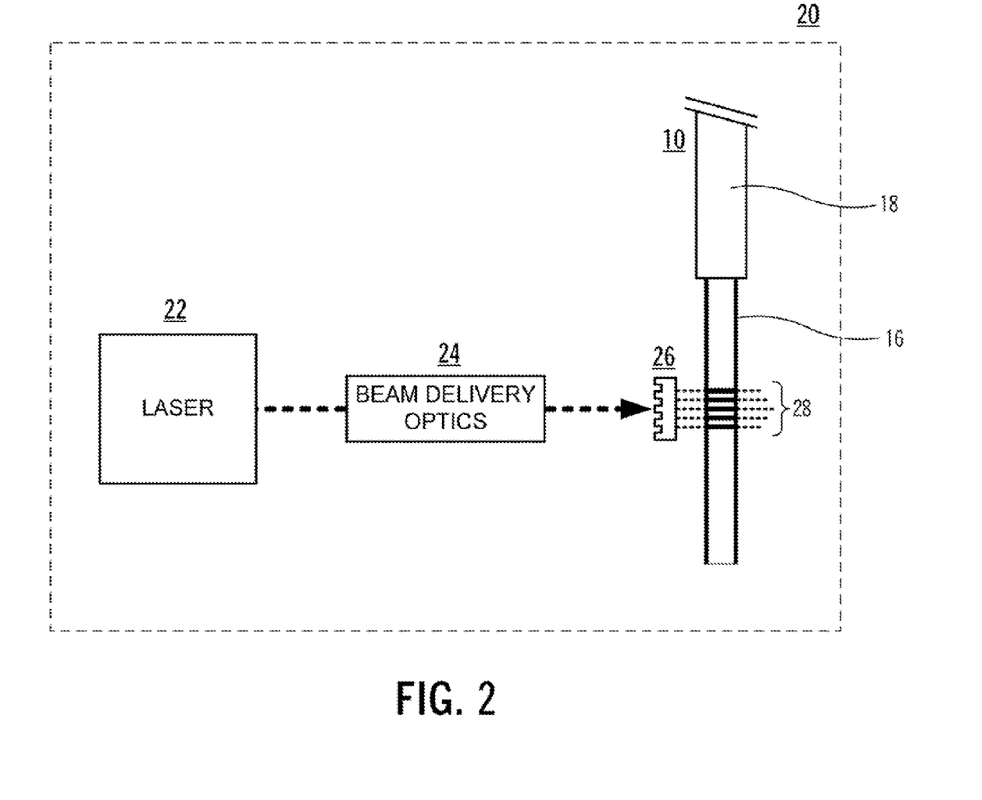

FIGS. 1 and 2 show diagrams, not drawn to scale, of the test fiber 10 and an inscription station 20. The test fiber 10 was a single-core fiber comprising a core region 12, a cladding region of 80 μm in diameter surrounding the core 14, a hermetic carbon layer 16, and a protective polyimide coating 18 surrounding the carbon layer 16. The fiber core region 12 was doped with germanium at a concentration resulting in a relatively high degree of photosensitivity and a numerical aperture of 0.21. The carbon coating 14 was applied during the draw process and had a thickness of approximately 0.029 μm. The polyimide coating 18 was also applied during the draw process, subsequent to the application of the carbon layer, and had a thickness of approximately 15 μm.

It is noted that, depending upon a particular application, a carbon coating having a thickness as high as 0.08 μm or thicker, may be considered.

The fiber 10 was loaded into the inscription station 20, which included means (not shown) for holding and positioning the fiber relative to the output of laser 22 and beam delivery optics 24. Prior to inscription, the polyimide coating 18 was stripped from the fiber, leaving the carbon coating 16 intact.

In the FIG. 2 inscription station 20, the laser 22 is implemented using an excimer UV laser manufactured by TuiLaser, which provided a laser beam having a wavelength of 248 nm. A phase mask 26 was used to generate a periodic interference pattern from the UV laser beam, which was used to inscribe a grating 28 into fiber core 12, or fiber core 12 and part of cladding 14, depending on the fiber design. It will be appreciated that the present invention can be practiced with other suitable types of lasers, depending upon a given application.

It is noted that there is a relatively wide range of wavelengths at which a carbon coating is sufficiently transparent to allow gratings to be written therethrough. These wavelengths include 193 nm, 244 nm, and 248 nm. Longer wavelengths may be employed, such as when using a "cold-writing" technique, a femtosecond laser, or other approaches.

Figure 3:
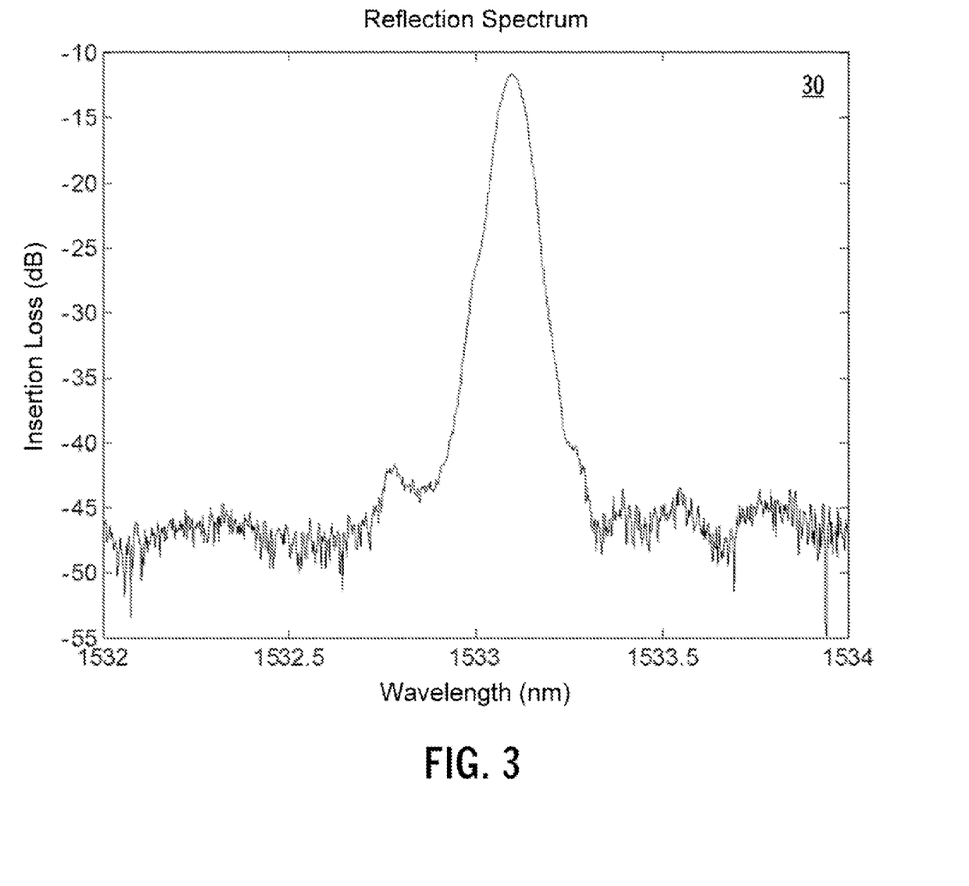
FIGS. 3-6 shows a series of reflection spectra illustrating the results of tests conducted using the fiber and the grating inscription setup shown in FIGS. 1 and 2.
Figure 4:
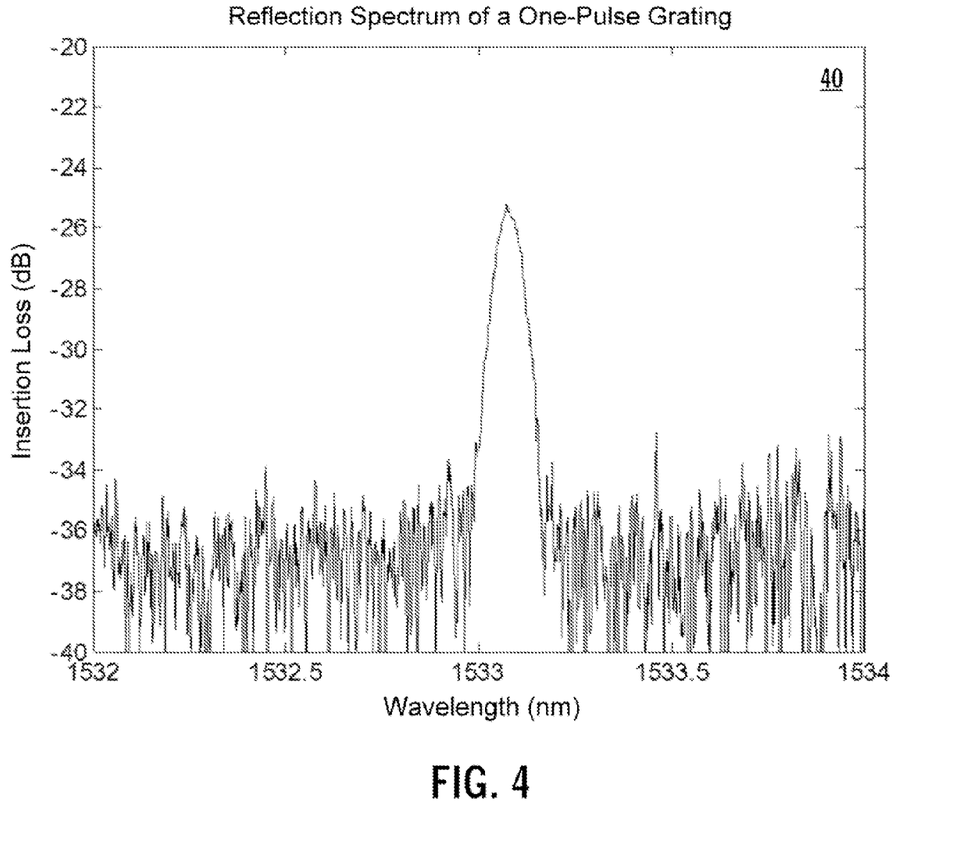
Figure 5:
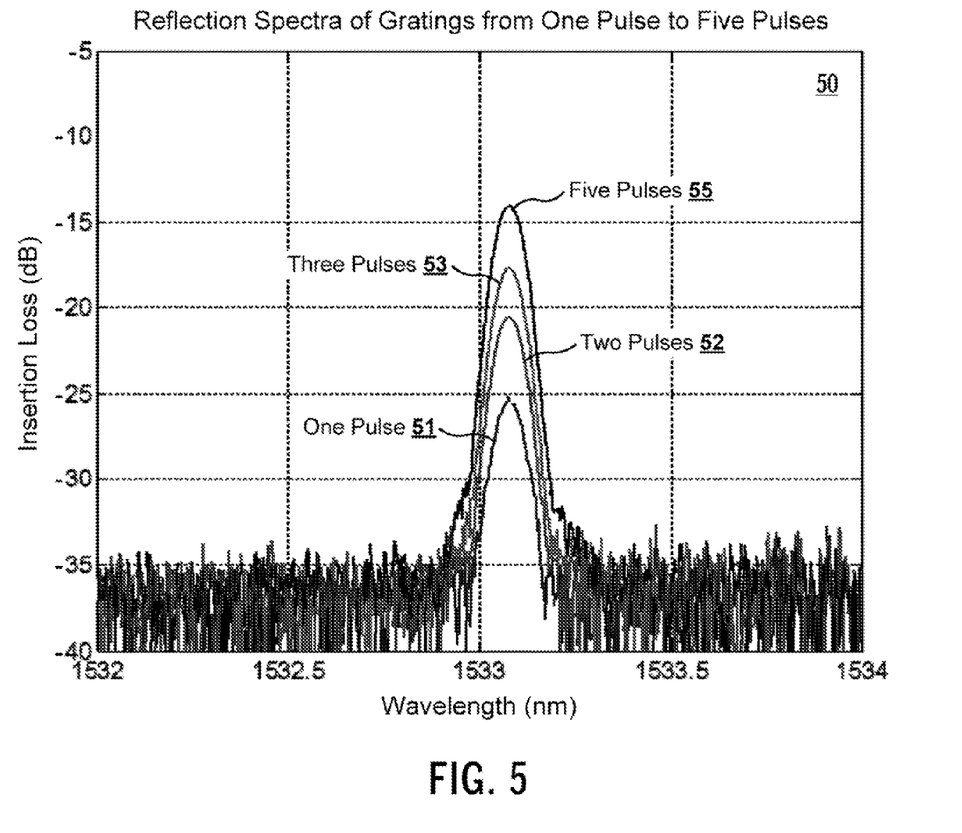

In the tests, a number of gratings were inscribed into the carbon-coated test fiber using different inscription parameters. The performance of the inscribed gratings was measured using a setup having a broadband source, a 3-port circulator and an optical spectrum analyzer (OSA). FIGS. 3-5 show a series of reflection spectra illustrating the test results. Among other things, the reflection spectra confirm that it is possible to inscribe gratings into a carbon-coated optical fiber. In addition, the reflection spectra confirm that, generally speaking, stronger FBGs can be written by longer exposure to the inscribing laser light and/or increasing the concentration of germanium (or other suitable dopant or combination of dopants) in the fiber into which the grating is written.

FIG. 3 shows a reflection spectrum 30 generated by an 8 mm grating inscribed into a length of the test fiber, as described above. The TuiLaser excimer laser was used to provide a 40 Hz pulsed laser beam having a wavelength of 248 nm. The laser energy density in the inscription region was ~25 mJ/cm$^2$. The exposure time was 60 seconds, after which time the grating did not change significantly. The laser energy density was chosen because at ~25 mJ/cm$^2$ the carbon coating showed no visual damage when inspected under a microscope. Experiments have shown that a power density level of 80 mJ/cm$^2$ will burn or damage the carbon coating. The exact upper limits for the inscription parameters have not yet been determined, but are expected to be between 25 mJ/cm$^2$ and 80 mJ/cm$^2$ for the 248 nm TuiLaser excimer laser. For other wavelengths or types of lasers, the laser energy density ranges may be different.

As shown in FIG. 3, the 8 mm grating reflection spectrum reaches a peak of ~−11 dB, which corresponds to a peak reflectivity of ~8%.

FIG. 4 shows the reflection spectrum 40 of an FBG written into a carbon-coated optical fiber by a single laser pulse (i.e., a "one-pulse" inscription process). The setup used was exactly the same as the one used to inscribe the FBG in FIG. 3. The one-pulse FBG achieved a peak reflectivity of ~0.29% (~−25.5 dB). This result is significant because it implies that the carbon-coated fiber gratings could be fabricated by using a draw tower grating writing technique.

The grating illustrated in FIG. 3 is the stronger of the two, and is suitable for use, for example, in a wavelength division multiplexing (WDM) based interrogator. The weaker one-pulse grating illustrated in FIG. 4 is suitable for use, for example, in a weak grating interrogator based on time division multiplexing/wavelength division multiplexing (TDM/WDM) techniques. In a TDM/WDM system, the reflectivity of individual FBGs can be as low as −35 dB (i.e., a reflectivity of ~0.03%).

FIG. 5 shows the reflection spectra 50 of a series of four 8 mm gratings written into the carbon-coated test fiber using the same testing setup, but with a different number of laser pulses (one pulse 51, two pulses 52, three pulses 53, and five pulses 54).

A further experiment was conducted to determine whether the inscription of gratings in the test fiber resulted in damage to the carbon coating not visually observed under a microscope.

Six FBGs similar to the one shown in FIG. 3 were inscribed into the test fiber. Their wavelengths were measured at room temperature after annealing for 64 hours at 85° C. The six FBGs were then placed into a deuterium exposure chamber having a pressure of 4,400 psi pressure and a temperature of 50° C. After 20 days, the FBGs were removed from the chamber and their wavelengths were measured again at room temperature. Deuterium gas was chosen because the setup for creating the above deuterium environment was readily available. It is expected that the same results should be obtained by replacing deuterium gas with hydrogen gas.

Compared to the wavelengths before the loading, the wavelength shifts from these FBGs ranged from −12 pm to 0 pm with an average wavelength shift of −7.2 pm. Given a variation in room temperature of ~0.5° C. and the relatively small wavelength shifts, it can be concluded that deuterium did not enter into the fiber core with those loading conditions. It can also be concluded that the grating writing did not damage the carbon coating.

Figure 6:
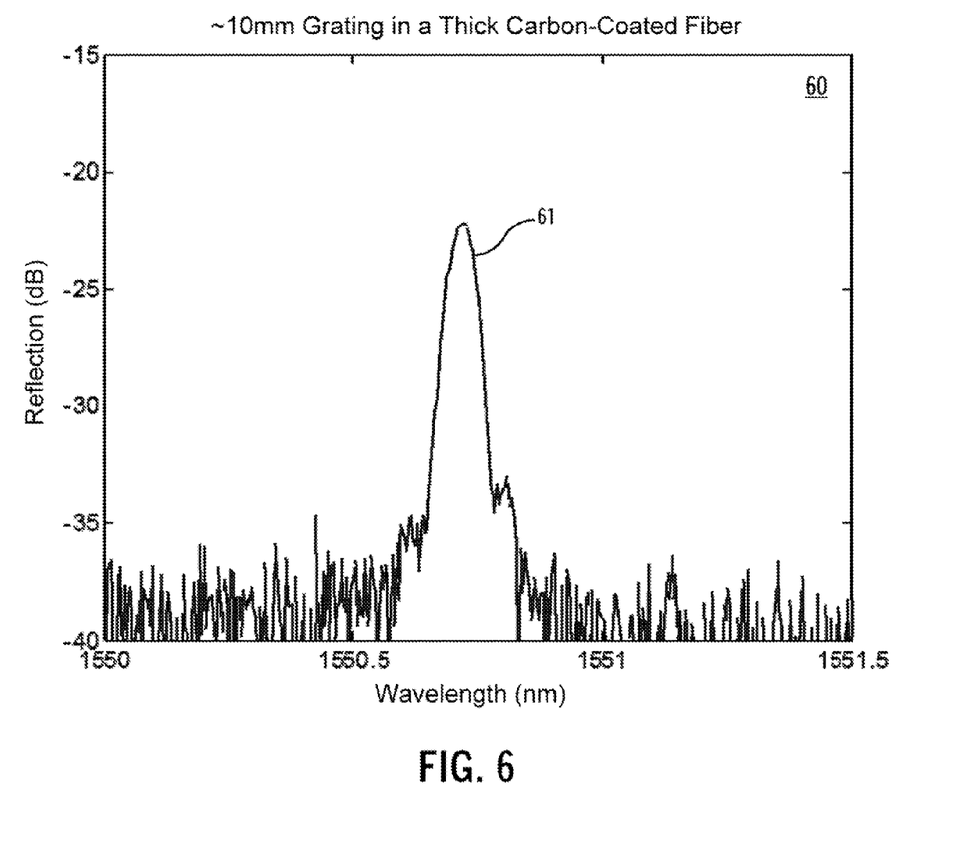

FIG. 6 shows a reflection spectrum 60 for a grating with a length of 10 mm that was written into another carbon-coated fiber, in which the carbon coating thickness was ~0.056 μm, the cladding diameter was 125 and the numerical aperture was 0.16. The laser conditions were the same as those in the tests of the gratings inscribed into carbon-coated optical fibers, in which the carbon coating had a thickness of ~0.029 μm. In reflection spectrum 60, the 0.6% peak reflection 61 is referenced to the cleaved fiber end reflection of 4%. Compared to the results obtained from the 0.029 μm carbon coated fiber, this lower reflectivity is believed to be mainly due to both the less photosensitive fiber and the thicker carbon coating. To verify this, gratings were also written in a fiber with the same glass structure as that of the 0.056 μm thick carbon coated fiber, but a 0.024 μm thick carbon coating. The results showed that 1.7% peak reflectivity was obtained for a 10 mm grating. It is believed that with higher germanium doping in the fiber core and extra photosensitization of the fiber, much higher grating peak reflectivity can be obtained even in the thick carbon coated fiber.

Mass Production of Carbon-Coated Optical Fiber Gratings

The above encouraging results have given rise to a number of possible scenarios for mass-producing FBGs in carbon-coated optical fibers. In one approach, FBGs are inscribed into a carbon-coated optical fiber in a post-secondary-coating process. In a second approach, FBGs are inscribed into a fiber as part of the draw process, after the application of a carbon coating. Each of these approaches is described in turn.

Post-Secondary-Coating Inscription

As used herein, the term "post-secondary-coating inscription" refers to an inscription process that is performed subsequent to the application of one or more secondary coatings over a carbon coating layer. A "post-secondary-coating inscription" technique can be performed in a draw tower as part of an optical fiber drawing process, or can be performed in an inscription station after a fiber has been removed from a draw tower.

Figure 7A:
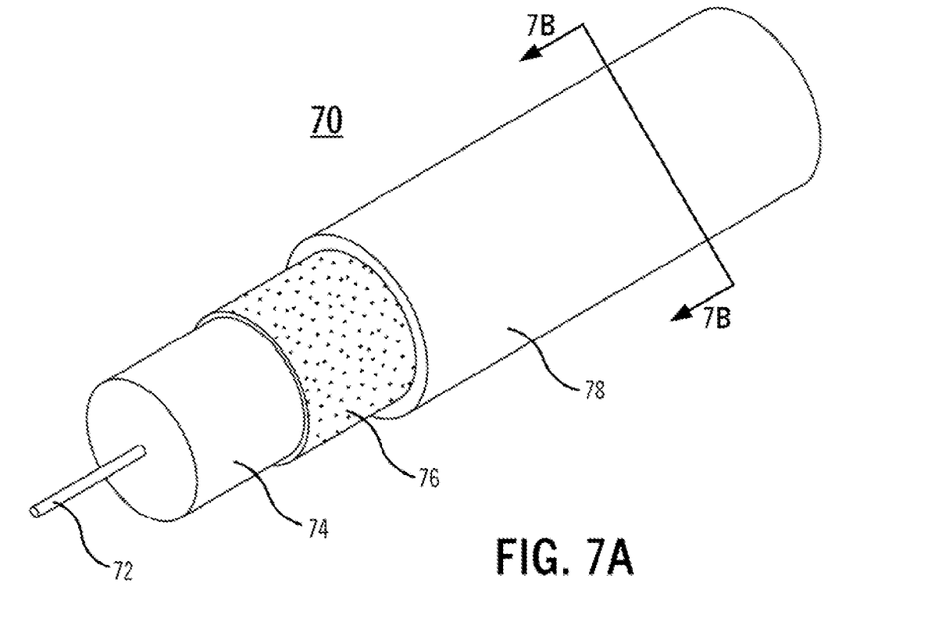
FIG. 7A shows an isometric view of a carbon-coated optical fiber configured for use in a post-secondary-coating inscription technique, in accordance with an aspect of the invention.
Figure 7B:
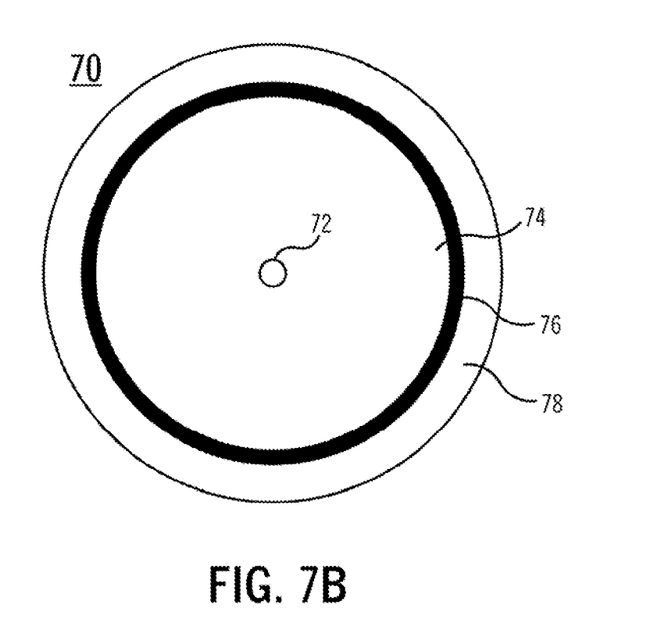
FIG. 7B shows a cross section of the carbon-coated optical fiber shown in FIG. 7A through the plane 7B-7B.

FIG. 7A shows an isometric view of a carbon-coated optical fiber 70 that is configured for use in a post-secondary-coating inscription technique, in accordance with an aspect of the invention. FIG. 7B shows a cross section of the carbon-coated optical fiber shown in FIG. 7A through the plane 7B-7B.

Fiber 70 comprises a core region 72, a cladding region 74, and a hermetic carbon layer 76. Surrounding the hermetic carbon layer is a protective "write-through" coating 78 that is substantially transparent to ultraviolet light. Such a coating is described in U.S. Pat. No. 5,620,495, which is owned by the assignee of the present application, which is incorporated herein by reference in its entirety. As disclosed therein, the outer coating comprises a polymer with low UV absorption. Such a coating may comprise, for example, a polymer selected from the group consisting of acrylates, aliphatic polyacrylates, silesesquioxanes, alkyl-substituted silicones and vinyl ethers. As used herein, the terms "acrylates" and "aliphatic polyacrylates" include methacrylate, poly(meth)acrylate, urethane acrylate, and the like.

Figure 8:
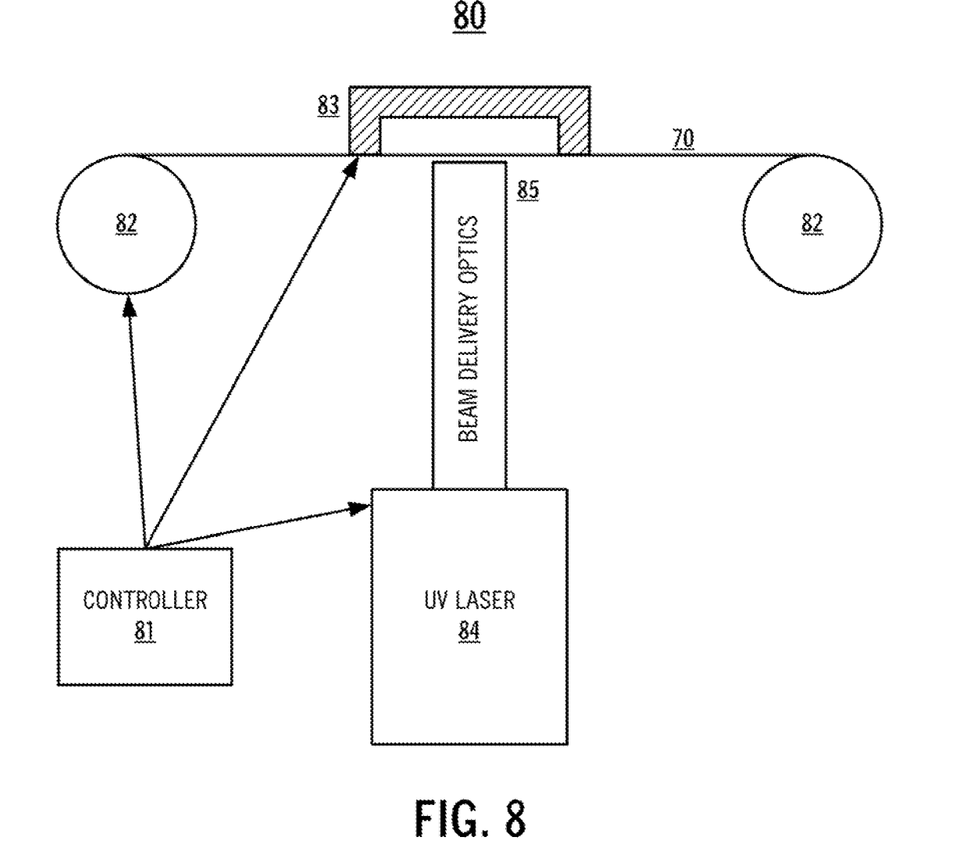
FIG. 8 shows a schematic diagram of an automated grating writing system for use with the fiber shown in FIGS. 7A and 7B.

FIG. 8 shows a schematic diagram of an automated FBG writing system 80 for use with fiber 70. System 80 comprises a programmable controller unit 81, an automated fiber winding system 82, an automated fiber clamping system 83, and a UV laser 84. The beam delivery optics 85 can be based on phase mask or holographic techniques. Fiber 70 is loaded into the automated fiber winding system 82, and gratings are written into the fiber 70 in a series of inscription cycles. In each cycle, the clamping system 83 clamps a portion of fiber 70 in position relative to the output of UV laser 84, as shaped by the beam delivery optics 85.

An FBG array fabricated using fiber 70 and grating inscription system 80 maintains pristine fiber strength. Further, as discussed above, since the fiber is carbon-coated, it can be configured for use in humid, hydrogen-rich, or other harsh environments, such as those described above. The "post-secondary-coating" approach allows for greater degrees of manipulation to achieve strict optical spectrum requirements not normally achievable with draw-tower grating writing.

Pre-Secondary-Coating Inscription

As used herein, the term "pre-secondary-coating inscription" refers to an inscription process that is performed subsequent to the application of a carbon coating layer, but prior to the application of a secondary coating over the carbon coating layer.

Figure 9:
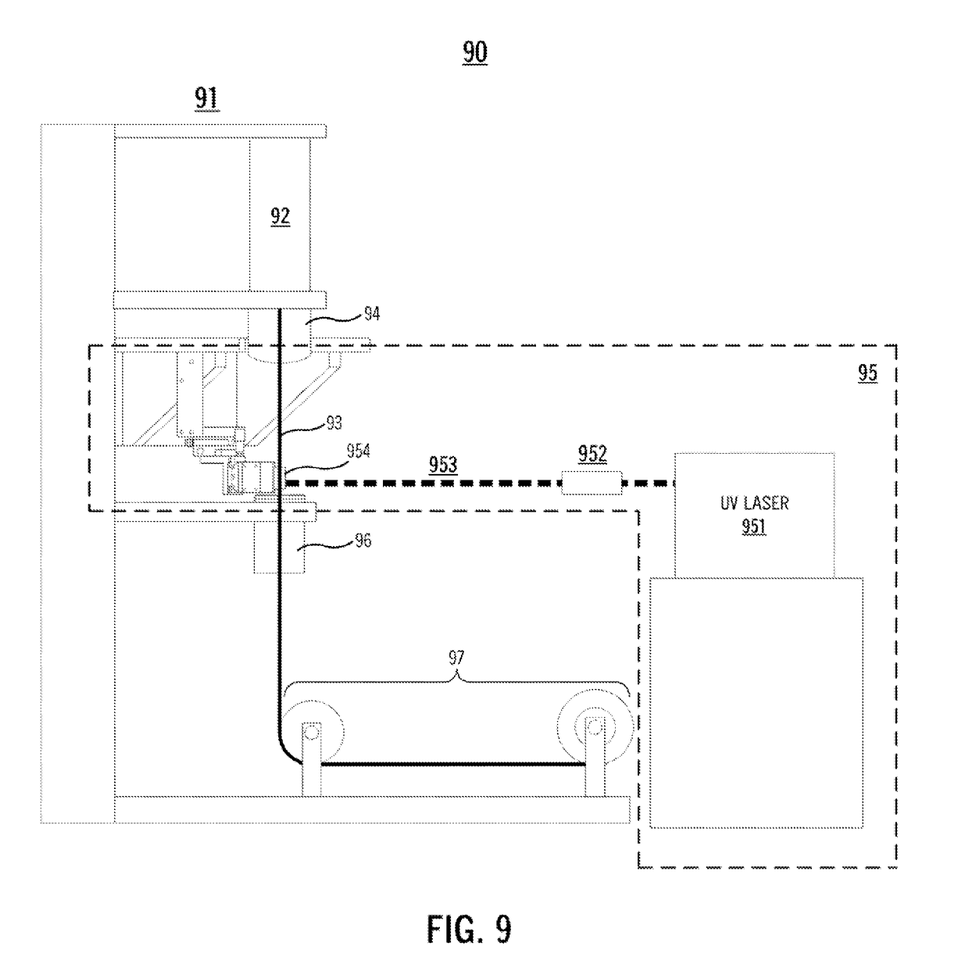
FIG. 9 is a schematic diagram of an automated system according to an aspect of the invention for inscribing gratings into a carbon-coated optical fiber as part of the draw process.

In an exemplary practice of a pre-secondary-coating inscription technique according to an aspect of the invention, gratings are automatically inscribed into a carbon-coated optical fiber in a draw tower as part of the draw process. FIG. 9 is a schematic diagram of an automated system 90 according to this aspect of the invention.

System 90 comprises a draw tower 91 having a furnace 92 at its top that is configured to receive a fiber preform from which a fiber 93 is drawn. The drawn fiber descends through the following stages: a carbon coating applicator 94, in which a hermetic carbon coating is applied to the fiber 93; a grating inscription stage 95, in which gratings are inscribed into the fiber; a secondary coating die 96, in which an outer coating is applied over the carbon coating; and a fiber winding system 97 for collecting the finished fiber and winding it onto a bulk reel.

Grating inscription stage 95 comprises a UV laser 951 and laser beam delivery optics 952 that are configured to deliver an inscription laser beam 953 to a mask 954 and its mounting fixtures. Of course, other grating inscription techniques, such as a holographic technique, can also be implemented here. The amount of time required to inscribe each grating is sufficiently short, such that it is possible to inscribe gratings into fiber 93 without having to stop the fiber as it descends through the draw tower 91.

Because the outer coating is applied subsequent to the inscription of gratings into fiber 93, it is not necessary for the outer coating to be a write-through coating. Thus, the described approach provides flexibility with respect to the outer coatings that can be applied by the secondary coating die 96. Any of a number of different outer coatings may be used, including, for example, acrylate, polyimide, vinyl ether, silicone, silsesquioxane, epoxy, and even metal.

General Technique

Figure 10:
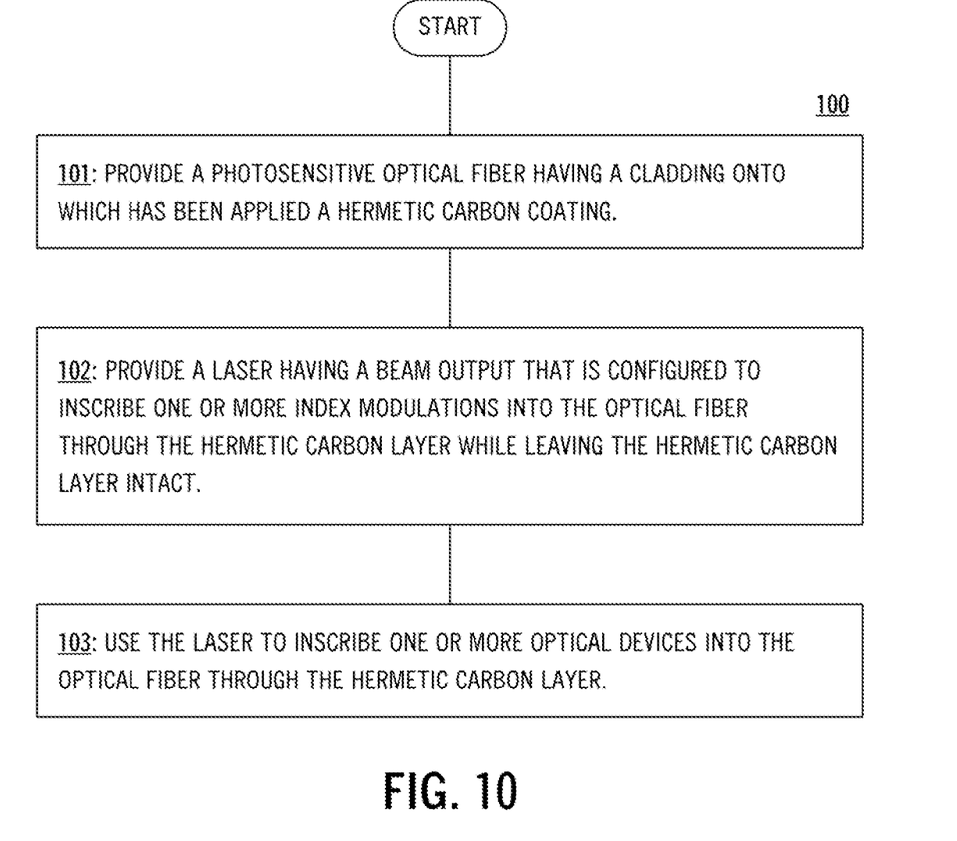
FIG. 10 shows a flowchart of a general technique according to the invention.

FIG. 10 is a flowchart illustrating a general technique 100 according to the above-described aspects of the invention.

Technique 100 comprises the following steps:

101: Provide a photosensitive optical fiber having a cladding onto which has been applied a hermetic carbon coating.

102: Provide a laser having a beam output that is configured to inscribe one or more refractive index modulations into the optical fiber through the hermetic carbon layer while leaving the hermetic carbon layer intact.

103: Use the laser to inscribe one or more optical devices into the optical fiber through the hermetic carbon layer.

CONCLUSION

Fiber Bragg gratings fabricated in carbon-coated fibers in accordance with the present invention have a number of advantages, including: (1) resisting hydrogen ingression below a certain temperature; (2) increasing long-term reliability when the fiber is under stress and in a humid environment.

In both post-secondary-coating and pre-secondary-coating inscription of FBGs in carbon-coated optical fibers, another advantage is that the FBG-inscribed carbon-coated optical fiber will have almost the same breaking strength as that of the pristine carbon-coated optical fiber (~550 kpsi), i.e., prior to inscription of the FBG therein.

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for fabricating one or more optical devices in a carbon-coated optical fiber, comprising:
   providing a photosensitive optical fiber having a hermetic carbon coating and an outer coating over the hermetic carbon coating, wherein the outer coating has an ultraviolet absorption that is sufficiently low so as to allow an ultraviolet laser to inscribe one or more optical devices into the fiber through the outer coating and the carbon coating;
   providing a laser having a beam output that is configured to inscribe one or more refractive index modulations into the optical fiber through the hermetic carbon layer and the outer coating while leaving the hermetic carbon layer and the outer coating intact; and
   using the laser to inscribe one or more optical devices into the optical fiber through the hermetic carbon layer and the outer coating.

2. The method of claim 1,
   wherein the one or more optical devices comprise one or more fiber gratings.

3. The method of claim 2, wherein a phase mask technique is used to inscribe the one or more gratings into the fiber.

4. The method of claim 2, wherein a holographic technique is used to inscribe the one or more gratings into the fiber.

5. The method of claim 1,
   wherein the carbon coating is applied to the fiber during draw, and
   wherein the one or more optical devices are inscribed into the fiber during a post-secondary-coating process.

6. The method of claim 5,
   wherein, during draw, an outer coating is applied over the carbon coating,
   wherein the outer coating has an ultraviolet absorption that is sufficiently low so as to allow the one or more optical devices to be inscribed into the fiber, in a post-secondary-coating process, through the outer coating and the carbon coating, using an ultraviolet laser.

7. The method of claim 6, wherein the outer coating comprises a polymer selected from the group consisting of acrylates, aliphatic polyacrylates, silesesquioxanes, alkyl-substituted silicones and vinyl ethers.

8. A method for fabricating a photosensitive, carbon-coated optical fiber, comprising:
   doping a fiber to have a high degree of photosensitivity;
   applying a hermetic carbon coating to the fiber cladding; and applying an outer coating over the hermetic carbon coating, wherein the outer coating has an ultraviolet absorption that is sufficiently low so as to allow the one or more optical devices to be inscribed into the fiber, in a post-secondary-coating process, through the outer coating and the carbon coating, using an ultraviolet laser.

9. The method of claim 8, wherein the fiber core or fiber core and part of fiber cladding are doped with one or more rare-earth dopants.

10. The method of claim 9, wherein the one or more photosensitive dopants comprises germanium.

11. The method of claim 10, wherein hydrogen or deuterium loading is used to increase the photosensitivity of the fiber.

12. The method of claim 11, wherein hydrogen or deuterium is loaded into the fiber subsequent to the application of the carbon coating by heating the fiber to a temperature at which the hydrogen or deuterium to be loaded passes through the carbon coating.

\* \* \* \* \*